United States Patent [19]
Child et al.

[11] 3,927,999
[45] Dec. 23, 1975

[54] METHANE-RICH GAS PROCESS

[75] Inventors: Edward T. Child, Tarrytown, N.Y.; Allen M. Robin, Anaheim, Calif.

[73] Assignee: Texaco Inc., New York, N.Y.

[22] Filed: Dec. 28, 1973

[21] Appl. No.: 429,469

[52] U.S. Cl. ............... 48/197 R; 48/215; 252/373; 260/449 M
[51] Int. Cl.² ............................................ C10J 3/06
[58] Field of Search........... 48/215, 197 R; 252/373; 260/449 M

[56] References Cited
UNITED STATES PATENTS

| | | | |
|---|---|---|---|
| 2,963,348 | 12/1960 | Sellers.............................. | 48/197 R |
| 3,444,099 | 5/1969 | Taylor et al....................... | 48/197 R |
| 3,709,669 | 1/1973 | Marion et al. ..................... | 48/215 |
| 3,740,204 | 6/1973 | Slater et al........................ | 48/215 |
| 3,816,332 | 6/1974 | Marion .............................. | 48/215 |

FOREIGN PATENTS OR APPLICATIONS

| | | | |
|---|---|---|---|
| 165,746 | 10/1955 | Australia......................... | 260/449 M |
| 993,974 | 6/1965 | United Kingdom............... | 48/214 |

Primary Examiner—S. Leon Bashore
Assistant Examiner—George C. Yeung
Attorney, Agent, or Firm—T. H. Whaley; C. G. Ries; Albert Brent

[57] ABSTRACT

A methane-rich gas stream is produced by catalytic methanation of synthesis gas feed comprising $H_2$ and CO. When the mole ratio $H_2/CO$ of the synthesis gas feed is in the range of about 0.5 to 1.15, by adjusting the mole % $H_2O$ in the synthesis gas feed to a value in the range of about 0.1 to 15., the gross heating value of the product gas may be increased to a value above that obtained with a dry substantially $CO_2$-free methanator feed gas. This effect of adding $H_2O$ becomes more pronounced as the $H_2/CO$ ratio drops further below the maximum value of 1.13. Further, in a preferred embodiment the gross heating value of the product gas (with $H_2O$ and $CO_2$ removed) was maximized by adjusting the mole % $H_2O$ in the synthesis gas feed to the methanator to a critical value in the range of 1.0 to 3.0 and preferably 2.0 while maintaining the $H_2/CO$ mole ratio of the synthesis gas feed at a critical value in the range of about 1 to 1.15 and preferably 1.13.

14 Claims, 1 Drawing Figure

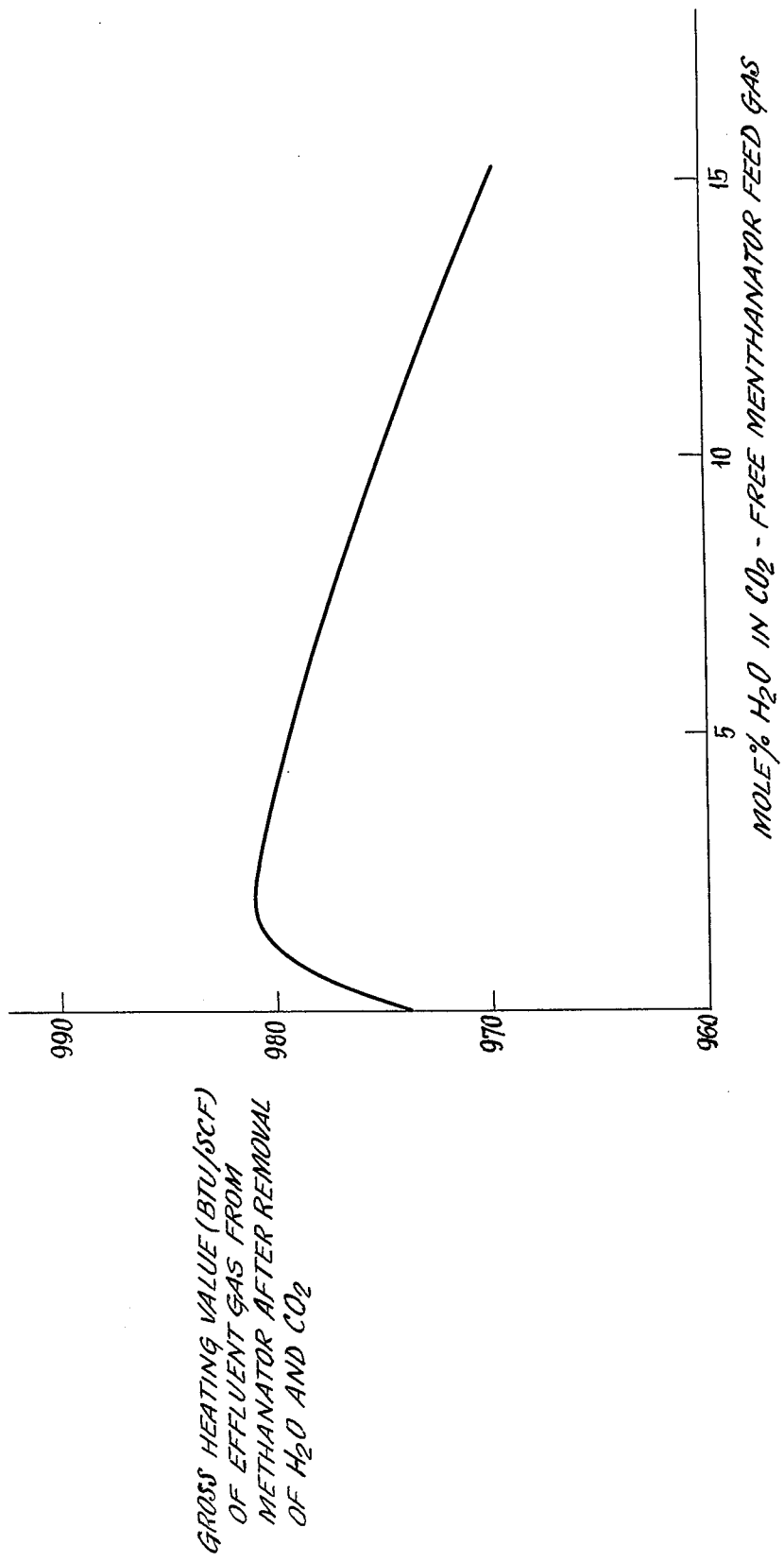

METHANE-RICH GAS PROCESS

BACKGROUND OF THE INVENTION

1. Field of the Invention

This invention relates to an improved process for the production of methane-rich gas. More specifically, the present invention relates to the production of gaseous heating fuels having a gross heating value of at least about 800 BTU per SCF and preferably 950 BTU per SCF or more from low cost hydrocarbonaceous materials. The product gas may be burned without polluting the environment.

2. Description of the Prior Art

A national dilemma exists as the result of a diminishing supply of natural gas and an increasing demand for it. The impact of the gas crisis is being felt nationwide in rising prices, in governmental regulations with respect to the consumption of natural gas, and in prohibitions against the use of natural gas in future commercial, industrial and apartment-house construction. It is imperative that alternate sources of low-cost gaseous heating fuels be developed.

In coassigned U.S. Pat. No. 3,688,438 synthesis gas was made having up to 26 volume percent of methane by the partial oxidation of a hydrocarbonaceous fuel using comparatively high steam to fuel weight ratios and no subsequent catalytic methanation step. In coassigned U.S. Pat. No. 3,709,669 the synthesis gas leaving the partial oxidation gas generator is subjected to an additional step involving the water gas shift reaction to adjust the $H_2/CO$ mole ratio to preferably 3 before catalytic methanation.

In comparison with the prior art, by the subject invention the mole ratio $H_2/CO$ in the feed gas to the catalytic methanation zone is controlled along with the mole % $H_2O$. Because of this the gross heating value of the product gas (after $H_2O$ and $CO_2$ are removed) is greater than the gross heating value obtained when the feed gas to the methanator contains no moisture. Further, criticality is shown.

One economic benefit of the subject invention is the elimination of the troublesome water-gas shift reaction considered essential by prior art processes to adjust the the $H_2/CO$ ratio of the feed gas stream to the methanator.

SUMMARY

It was unexpectedly found that in the catalytic methanation of synthesis gas, i.e., mixtures of $H_2$ + CO, when the mole ratio $H_2/CO$ of the synthesis gas feed to the methanator is in the narrow range of about 0.5 to 1.15 the amount of $CH_4$ produced is substantially increased by adjusting the mole % $H_2O$ in the feed gas to a value in the range of 0.1 to 15.

Criticality was shown in a preferred embodiment of the invention. The gross heating value of the product gas (with $H_2O$ and $CO_2$ removed) was maximized by adjusting the mole % $H_2O$ in the synthesis gas feed to the methanator to a critical value in the range of 1.0 to 3.0 and preferably 2.0 while maintaining the $H_2/CO$ mole ratio of the synthesis gas feed to a critical value in the range of about 1 to 1.15 and preferably 1.13.

One embodiment of the subject invention includes the steps of partial oxidation of a hydrocarbonaceous fuel feed to produce a process gas stream comprising $H_2$ and CO having a critical mole ratio $H_2/CO$ in the range of about 0.5 to 1.15, $H_2O$, $CH_4$, and minor amounts of particulate carbon and gaseous impurities; cooling the process gas stream and removing particulate carbon, $CO_2$, and gaseous impurities therefrom; adjusting the mole % $H_2O$ in the process gas stream to a value in the range of about 0.1 to 15 and the temperature to a value in the range of about 390°F. to 600°F.; and introducing the process gas stream into a catalytic methanation zone where said $H_2$ and CO are reacted together to produce an effluent gas stream comprising $CH_4$ and containing gaseous impurities selected from the group consisting of $H_2O$, $CO_2$, and mixtures thereof; and removing said gaseous impurities to produce a methane-rich product gas stream comprising about 70 to 98 mole % methane or higher (dry basis).

The product gas may be used as a clean fuel gas having a gross heating value of about 800 BTU/SCF and in the preferable embodiment to about 950 BTU/SCF or higher; or it is suitable for use in chemical synthesis. Further, it may be burned as a fuel without polluting the atmospheres.

DESCRIPTION OF THE INVENTION

The present invention relates to a continuous process for producing a methane-rich gas stream comprising 70 to 98 mole % $CH_4$ or more (dry basis).

In one important step in the subject process, CO and $H_2$ in the process gas stream are reacted together to produce methane in a catalytic methanator. Since the desired methanation reaction may be assumed to be $CO + 3H_2 \longrightarrow CH_4 + H_2O$, one would believe that the methane content of the effluent gas stream from the methanator would increase as the water content of the gaseous feed methanator is decreased. This conclusion is based on thermodynamic calculations using the above cited reaction in which $H_2O$ appears on the right hand side of the equilibrium equation together with $CH_4$.

However, it was unexpectedly found that over the normal operating range of temperature and pressure when the mole ratio $H_2/CO$ in the feed gas to the methanator was in the range of about 0.5 to 1.15, suitably about 0.8 to 1.13, and preferably about 1.00 to 1.13, the gross heating value of the effluent gas from the methanator could be increased to a value above that obtained when the feed to the methanator was dry i.e. 0 mole % $H_2O$ and free from $CO_2$, by adjusting the mole % $H_2O$ in the feedgas to a value in the range of about 0.1 to 15, suitably about 0.5 to 10, such as 1.0 to 3.0. The beneficial effect of adding $H_2O$ to a dry $CO_2$-free methanator feed gas stream increased as the $H_2/CO$ ratio of the feedgas stream decreased below 1.15. Further, when using $H_2$ deficient streams with low mole ratio $H_2/CO$, e.g., below 0.9, the heating value of the product gas may be increased to about 800 BTU/SCF, or more. When the $H_2/CO$ mole ratio in the feedgas to the methanator exceeded 1.15, the gross heating value of the effluent gas from the methanator actually decreased as the mole % $H_2O$ in the feedgas to the methanator was increased above 0.

Further, in a preferable embodiment it was unexpectedly found that the gross heating value of the effluent gas stream from the methanator after $H_2O$ and $CO_2$ were removed could be maximized to a value in the range of about 950 to 998 BTU/SCF or higher by maintaining a critical mole ratio $H_2/CO$ in the feed gas to the methanator in the range of about 1 to 1.15, suitably 1.1 to 1.13 and preferably 1.13, while adjusting the mole % $H_2O$ to a critical value in the range of 1.0 to 3.0 and preferably 2.0.

One theory for the aforesaid unexpected results is that critical amounts of $H_2O$ react with CO in the process gas stream to produce $CO_2$ and more $H_2$. Thus, in the catalytic methanator, the water-gas shift reaction goes on simultaneously with the methanation reaction. This additional $H_2$ is then available to react with CO to make more $CH_4$. The additional $CO_2$ is removed in a subsequent acid gas removal system and, hence, does not dilute the heating value of the resulting fuel gas.

In the first step of a preferred embodiment of the process, synthesis gas comprising hydrogen, carbon monoxide, carbon dioxide, water vapor, methane, and containing small amounts of nitrogen, argon, carbonyl sulfide, hydrogen sulfide, and entrained particulate carbon is produced by the reaction of a hydrocarbonaceous fuel by partial oxidation with free-oxygen containing gas and a temperature moderator in the reaction zone of a free-flow synthesis gas generator free from packing or catalyst. The composition of the charge and the conditions of the reaction may be controlled so as to produce an effluent gas stream containing a mole ratio $H_2/CO$ in the range of about 0.5 to 1.15 and from about 0.1 to 10 weight percent (wt. %) of entrained particulate carbon (basis weight of carbon in the hydrocarbonaceous fuel).

Hydrocarbonaceous fuels which are suitable feedstocks for the process include by definition various petroleum distillate and residua, naphtha, gas oil, residual fuel, asphalt, reduced crude, whole crude, coal tar, coal oil, shale oil, and tar sand oil. Included also are pumpable slurries of solid hydrocarbonaceous fuels, e.g., coal, particulate carbon, and petroleum coke in a liquid hydrocarbon fuel carrier such as previously listed, or water.

The temperature moderator is selected from the group consisting of $H_2O$, $CO_2$ and mixtures thereof. $H_2O$ is the preferred temperature moderator and may be supplied to the generator in liquid or gaseous phase. It may be introduced either separately or in admixture with the free oxygen containing gas or with the hydrocarbonaceous feedstocks, or both. Water will moderate the temperature of the reaction zone and may also react with CO and the hydrocarbon fuel in the reaction zone of the gas generator.

The preferred weight ratio of $H_2O$ to hydrocarbonaceous fuel in the feed to the generator in the subject invention is in the narrow range of 0.2 to 3.0, and preferably 0.5 to 1.0.

Substantially pure oxygen which is introduced into the reaction zone of the synthesis gas generator simultaneously with the $H_2O$ and hydrocarbonaceous fuel. Suitably, an annulus-type burner, such as described in coassigned U.S. Pat. No. 2,928,460 issued to du Bois Eastman et al., or in coassigned U.S. Pat. No. 3,743,606 issued to C. P. Marion et al., may be employed. The free-oxygen containing gas may be introduced at a temperature in the range of about ambient at 1000°F. The substantially pure oxygen comprises 95 mole % $O_2$ or more and perferably 99 mole % $O_2$ or more. Substantially, pure oxygen is preferred so as to avoid minor amounts of nitrogen and argon in the effluent gas. A product gas having a heating value in the range of about 980 to 998 BTU/SCF or higher may be made using substantially pure oxygen comprising about 99 mole % $O_2$ or more. The amount of oxygen supplied is controlled so as to prevent complete oxidation of the hydrocarbonaceous feed and to control the temperature in the reaction zone.

The reaction zone is preferably a conventional Texaco Synthesis Gas Generator. The synthesis gas generator is free from any obstructions to the free flow of the gases therethrough. The gas generator is a cylindrically shaped vertical steel pressure vessel whose inside walls are lined with refractory. An axially aligned flanged inlet port is located at the top of the vessel, and a flanged outlet port is located at the bottom. The various feedstreams may be introduced into the gas generator at ambient temperature, but preferably they are introduced at a temperature in the range of about 100° to 1000°F. Preferably, an annulus-type burner which is axially mounted in the top flanged port of the generator may be used for introducing and mixing the feedstreams.

Suitable gas generators are disclosed in coassigned U.S. Pat. Nos. 2,818,326 and 3,000,711 to du Bois Eastman et al. The size of the reaction chamber is selected so that the average residence time of the reactants and resulting reaction products within the reactor is within the range of 0.5 to 20 seconds, and preferably 1 to 8 seconds.

In the reaction zone of the free-flow noncatalytic synthesis gas generator, reaction takes place at an autogenous temperature in the range of about 1700° to 3100°F. and preferably in the range of about 2000° to 2800°F, and at a pressure in the range of about 1 to 250 atmosphere gauge and preferably in the range of about 20 to 200 atmospheres gauge.

The effluent gas stream from the gas generator has the following dry gas composition in mole %: $H_2$ 40 to 59; CO 30 to 49; $CO_2$ 2 to 20; $CH_4$ nil to 10; $H_2S$ nil to 2.0; COS nil to 0.1; $N_2$ nil to 0.3; Ar nil to 0.3; and from 0.1 to 10 wt. % of particulate carbon (basis C in hydrocarbonaceous fuel). The mole ratio $H_2/CO$ is in the range of about 0.5 to 1.15.

By conventional means, the effluent gas stream from the generator is cooled, and the particulate carbon and gaseous impurities are removed. For example, the effluent gas stream may be passed through an in-line waste-heat boiler and cooled to a temperature in the range of about 400° to 800°F. by indirect heat exchange with water, thereby producing steam. The steam may be used elsewhere in the process, such as in the gas generator. Alternately, the effluent gas stream from the gas generator may be quenched in water in a quench tank such as shown in coassigned U.S. Pat. No. 2,896,927. Advantageously, by this means a large portion of the particulate carbon and other solids entrained in the effluent gas stream is removed by the quench water.

Further, particulate carbon and any other entrained solids may be removed from the effluent gas stream by well known scrubbing techniques in a gas-liquid scrubbing zone. For example, the particulate carbon may be removed by scrubbing the process gas with a scrubbing fluid comprising oil, water, or both. The slurry of particulate carbon and scrubbing fluid may be recycled to the gas generator as a portion of the feedstock.

When oil is used as the scrubbing fluid, preferably the temperature of the scrubbing oil is kept below its cracking temperature and above the dewpoint of $H_2O$ in the process gas stream. In one embodiment of our process, the process gas stream is introduced into a liquid-gas tray-type column, such as more fully described in Perry's Chemical Engineers' Handbook, Fourth Edition, McGraw Hill 1963, Pages 18-3 to 5 in countercurrent flow with a liquid hydrocarbon fuel oil. A slurry of particulate carbon and liquid hydrocarbon fuel oil is removed from the bottom of the scrubbing column at a suitable preheat temperature for introducing into the reaction zone of the synthesis gas generator as a portion of the hydrocarbonaceous feedstock.

When required, additional scrubbing may be provided to supplement the aforesaid gas scrubbing. For example, the gas stream may be quenched in hydrocarbon oil or washed with a liquid hydrocarbon fuel by means of a scrubbing nozzle or venturi scrubber, such as described in Perry's Chemical Engineers' Handbook Fourth Edition, McGraw-Hill 1963, Pages 18-54 to 56. The process gas stream leaving from the top of the scrubbing tower substantially free from particulate carbon and at a temperature in the range of about 400°–650°F. is then cooled to condense out and separate any volatilized hydrocarbons and water found therein. For additional information on suitable gas scrubbing, reference is made to coassigned U.S. Pat. No. 3,639,261.

$CO_2$, $H_2O$, $H_2S$ and COS may be removed from the process gas stream in an acid-gas separation zone by a suitable conventional process involving refrigeration and physical or chemical absorption with solvents, such as methylalcohol, n-methyl pyrrolidone, triethanolamine, propylene carbonate, or alternately with hot potassium carbonate. Methane should be substantially insoluble in the solvent selected. Most of the $CO_2$ absorbed in the solvent can be released by simple flashing, the rest being removed by stripping. This may be done most economically with impure nitrogen that is available free of cost when an air-separation unit is used to provide oxygen for the gasification step. The stream of $CO_2$ has a purity of more than 98.5 percent and may therefore be used for organic synthesis. Alternately, it may be returned to the gas generator as the temperature moderator. The regenerated solvent is then recycled to the absorption column for reuse. When necessary, final cleanup may be accomplished by passing the process gas through iron oxide, zinc oxide, or activated carbon to remove residual traces of $H_2S$ or organic sulfide.

Similarly $H_2S$ and COS-containing solvent is regenerated by further flashing and stripping with nitrogen. The $H_2S$ and COS may be then converted into sulfur by a suitable process. For example, the Claus process may be used to produce elemental sulfur from $H_2S$, as described in Kirk-Othmer Encyclopedia of Chemical Technology, Second Edition Volume 19, John Wiley, 1969, Page 352.

By the subject invention, the methanation of the synthesis gas streams can be unexpectedly improved by adjustment of the feed gas to contain critical amounts of water i.e., 1.0 to 3.0 mole % if the objective is to maximize the heating value of the product gas after $CO_2$ and $H_2O$ removal. The water will also serve to keep moderate the exothermic nature of the methanation reaction. Further, it is theorized that such reactions as the water-gas shift reaction takes place in addition to methanation. Both of these reactions may be catalyzed by similar catalysts that contain large amounts of nickel.

The process gas stream after adjustment of the $H_2O$ content has the following composition in mole percent: $H_2$ 43 to 60, CO 33 to 50, $CH_4$ nil to 11, $H_2O$ 0.1 to 15, $CO_2$ 0.0, and 0 to less than about 500 parts per million of total sulfur, i.e., $H_2S$ + COS.

The mole % $H_2O$ in the process gas stream may be adjusted to a value in the range of about 0.1 to 15 mole % by any suitable procedure. For example, the $H_2O$ content of the process gas stream may be determined by laboratory analysis. $H_2O$ may be then added or deleted as required according to conventional techniques. A preferred way to adjust the $H_2O$ content is to pass the process gas stream through a saturation vessel where the gas stream is brought to the saturation temperature corresponding to the desired partial pressure of $H_2O$ in the process gas stream. In the saturation vessel the $H_2O$ in the process gas stream is brought into equilibrium with liquid water at the saturation temperature. For example, if it is desired to adjust the $H_2O$ content to 2.0 mole % and the gas stream contains more than 2.0 mole % $H_2O$, the excess water will condense out of the gas stream. Conversely, if the process gas stream in the saturator vessel should contain less than 2.0 mole % $H_2O$, water will vaporize into the gas stream until the gas stream contains 2.0 mole % $H_2O$. Saturation temperature vs partial pressure of steam may be obtained from Keenan-Keyes, "Thermodynamic properties of Steam," John Wiley, 1936.

The following example is offered to show how one may adjust the $H_2O$, in the process gas stream to 2 mole % when the total pressure in the line is 1 atmosphere gauge (29.4 psia). First calculate the partial pressure of $H_2O$ in the process gas stream by multiplying 0.02 × 29.4 psia to get 0.60 psia. From steam tables in Keenan-Keyes find the saturation temperature corresponding to the partial pressure of $H_2O$ of 0.60 psia. This corresponds to a saturator temperature of 75°F. The process gas stream is passed through a saturation vessel where an equilibrium saturation temperature of 75°F. and a total pressure of 1 atm. gauge is maintained while the process gas stream is in contact with water.

The temperature at equilibrium in the saturator vessel for various mole % $H_2O$ and total pressures of the process gas stream are shown in Table I.

TABLE I

| | MOLE % $H_2O$ IN PROCESS GAS STREAM | vs | EQUILIBRIUM TEMPERATURE IN THE SATURATOR |
|---|---|---|---|
| Mole % $H_2O$ | Total Pressure Atm. (gauge) | Partial Pressure of $H_2O$ psia | Equilibrium Temperature in Saturator |
| 1.5 | 250 | 55 | 287 |
| 1.5 | 1 | 0.44 | 75 |
| 2.0 | 250 | 72.0 | 308 |
| 2.0 | 1 | 0.60 | 85 |
| 2.5 | 250 | 92.0 | 322 |
| 2.5 | 1 | 0.735 | 91 |

The temperature of the process gas stream is adjusted by conventional means such as by heating to a value in the range of about 390° to 600°F. prior to its introduction into the catalytic methanation zone.

The catalytic production of methane from carbon monoxide and carbon dioxide is highly exothermic. Unless the heat is successfully removed from the catalyst bed, high feed-gas throughputs can produce excessive catalyst-bed temperatures that can destroy the activity of the catalyst and reduce methane yields. Temperature control may be effected by any of the following techniques: distribution of the feed-gas stream throughout fixed bed reactors by means of separate inlet points, embedding tubular coolers in the catalyst beds and producing steam which may be used elsewhere in the process, cooling the effluent gas between beds with simultaneous steam generation, or by using a free-flow tubular reactor whose inside surfaces are coated with catalyst.

Another method of controlling catalyst-bed temperatures while increasing the concentration of methane in the product gas consists of recycling a portion of the product gases through the catalyst bed at ratios ranging from 1–50 volumes of recycle gas per volume of fresh feed gas and preferably at recycle ratios in the range of 1 to 5.

The Group VIII transition elements, mainly iron, nickel, and cobalt, appear to be the most suitable for use as methanation catalysts. Typical commercial preparations contain about 33 to 78 weight percent of nickel oxide and about 12 to 25 percent of aluminum oxide and are used in the form of ⅜ × ⅜ inch or ¼ × ¼ inch cylindrical tablets. A typical nickel oxide catalyst is Girdler G65 produced by Chemetron Corp. Suitable catalyst compositions include the following: NiO—Al$_2$O$_3$ or NiO—MgO precipitated on kaolin and reduced with hydrogen; and also in parts by weight Ni 100 ThO$_2$ 6, MgO 12, and Kieselguhr (diatomaccous earth) 400 reduced with hydrogen for 2 hours at 752°F. followed by heating at 932°F. The life of the catalyst may be extended by maintaining the sulfur level in the reactant gases below about 0.005 grains of sulfur per thousand standard cubic feet.

The reaction temperature in the methanator is in the range of about 390° to 1400°F. Methane production varies inversely with reaction temperature. For example a preferable exit temperature for the aforesaid NiO—Al$_2$O$_3$ catalyst may be about 662°F. Space velocities range from 100 to 10,000 standard volumes of gas per volume of catalyst (hr$^{-1}$) and pressures range from 1 to 250 atmospheres. Preferably, the pressure in the methanator is substantially the same as that in the gas generator less any relatively minor ordinary drop in the line. Methane production varies directly with pressure.

The effluent gas from the methanation catalytic reactor comprises from about 40 to 50 volume percent of methane or higher along with one or more members of the following group CO, H$_2$, H$_2$O, CO$_2$, N$_2$ and Ar. The water in the effluent gas stream may be condensed out and any CO$_2$ is removed in the manner described previously, leaving methane-rich gas (92 volume percent or more).

In another embodiment of the invention for use with sulfur-containing hydrocarbonaceous fuels containing 1 to 7 wt. % sulfur such as liquid hydrocarbon fuel oils or high sulfur coal or mixtures thereof, a unique sulfur resistant methanation catalyst comprising in wt. % CoO 3 to 4, MoO$_3$ 9.5 to 16 and the remainder alumina, and preferably in wt. % CoO 3.2, MoO$_3$ 15.7 and Al$_2$O$_3$ 81.1 is used as the catalyst in the methanation step. In this second embodiment, the effluent gas stream from the generator having a H$_2$/CO mole ratio in the range of about 0.5 to 1.15 is cooled to a temperature in the range of about 400° to 800°F. by direct or indirect heat exchange as previously described, particulate carbon is removed, the H$_2$O content is adjusted to a value in the range of about 0.1 to 15 mole %, the temperature is adjusted to a value in the range of about 400° to 700°F., and then the process gas stream is introduced into the catalytic methanator. The reaction temperature is in the range of about 500° to 1500°F and the pressure is in the range of about 1 to 250 atmospheres. After methanation preferably all of the H$_2$O, CO$_2$ and H$_2$S in the effluent gas stream are removed by conventional methods, leaving substantially pure methane.

By the subject invention, a clean fuel gas may be produced. This process has the following significant advantages over other schemes for making fuel gas:

1. A higher methane content and heating value are obtained than are possible for a methanator operating with a dry CO$_2$-free feed at a given reactor temperature.
2. Oxygen and steam requirements will be reduced in comparison with U.S. Pat. No. 3,688,438 since the generator will operate at a lower O/C ratio.
3. Substantial reduction in generator and waste heat boiler size since the large steam volume will have been reduced by about 50–90 percent.
4. The shift converter (either thermal or catalytic) proposed in some other schemes can be eliminated since the 3:1 H$_2$:CO ratio is no longer required as feed to the methanator.
5. Lower CO$_2$ production in comparison with U.S. Pat. No. 3,688,438 will reduce the load on the acid gas removal section and may even permit the direct handling of the H$_2$S/CO$_2$ stream in a Claus unit rather than having to separate the H$_2$S and CO$_2$.
6. With sulfur resistant catalysts, it is not necessary remove the acid gases, at least not completely, before the methanator. Thus, if a gas purification step is required, it may be performed once only after the methanation step.

EXAMPLES

The following examples are offered as a better understanding of the present invention but the invention is not to be construed as unnecessarily limited thereto.

EXAMPLE I

Run No. 1 — On an hourly basis about 576 pounds of California vacuum residuum feedstock at a temperature of 288°F. are introduced into a free-flow non-catalytic synthesis gas generator by way of an annulus-type burner. The oil feedstock has an API gravity of 8.1, a viscosity of 1300 Saybolt seconds Furol 122°F., and a heat of combustion of 18.029 BTU (British Thermal Units) per pound. The oil feedstock has the following ultimate analysis in weight %: C 85.82, H 10.43, O 0.0, N 0.96, S 2.64, and ash 0.15.

Simultaneously, 142 pounds of H$_2$O at a temperature of 72°F. and 7194 SCFH (Standard Cubic Feet per Hour) of substantially pure oxygen (99 mole % O$_2$ or more) at a temperature of 67°F. are charged into the gas generator. The weight ratio H$_2$O/fuel is 0.25 and the atomic ratio of O$_2$ in the substantially pure oxygen to carbon in the fuel is 0.920.

Reaction takes place between the feedstreams in the reaction zone at a pressure of about 70 atmospheres and at an autogenous temperature of 2010°F. The average residence time in the 2.12 cubic ft. reaction zone is about 4.0 seconds. By the partial oxidation reaction, the hydrocarbonaceous feedstream is converted into 28126 SCFH of an effluent gas stream having the following dry gas composition in mole percent: CO 45.83, H$_2$ 45.87, CO$_2$ 6.85, CH$_4$ 0.94, N$_2$ 0.24, H$_2$S 0.19, COS 0.00 and Ar 0.08. In addition, 18.5 pounds per hour of particulate carbon is entrained in the effluent gas stream from the gas generator.

The process gas stream leaving the gas generator is cooled to a temperature of 650°F. by indirect heat exchange with water in a waste heat boiler. Simultaneously, steam for recycle to the gas generator is produced in the waste heat boiler. In a manner previously described, the particulate carbon is scrubbed from the process gas stream, and water and the acid gases, e.g., $CO_2$, $H_2S$, COS are removed. A stream of dry synthesis gas substantially comprising $H_2$ and CO and having a mole ratio of about 1.0 is produced.

The aforesaid stream of dry synthesis gas at a temperature of 100°F. and a pressure of 1020 psia is passed through a saturator vessel where it is sprayed with hot water. The process gas stream leaves the saturator at a temperature of 229°F., and containing in mole % $H_2$ 48.4, CO 48.4, $CH_4$ 0.9, $H_2O$ 2.0, $H_2S$ + COS less than 500 parts per million (ppm), and $CO_2$ 0, $N_2$ 0.2, and Ar 0.1.

At a space velocity of 3000 standard volumes of gas per volume of catalyst per hour and at 500°F. the aforesaid stream of synthesis gas is introduced into a catalytic methanation zone. The methanation catalyst comprises in parts by weight Ni 100, ThO 6, MgO 12 and Kieselguhr 400. $H_2$ and CO are reacted together in a multibed adiabatic reactor equipped with cooling coils between beds at a pressure of about 69 atmospheres gauge. The methane-rich gas stream leaving the methanator at a temperature of 800°F., has the following composition in mole %: $CH_4$ 48.1, $H_2O$ 3.9, $CO_2$ 46.2, $H_2$ 0.5, CO 0.7, and N+Ar 0.60. By methods previously described, $H_2O$ and $CO_2$ are removed from the process gas stream to produce 7473 SCFH of high gas having a gross heating value of 981 BTU/SCF and the following composition in mole %: $CH_4$ 96.4, $H_2$ 1.0, CO 1.4, and $N_2$+Ar 1.2.

EXAMPLE II

The unobvious critical relationship between the mole % $H_2O$ in the feedgas to the methanator and the gross heating value of the effluent gas from the methanator after the removal of $CO_2$ and $H_2O$ may be shown as follows. The process described in Example I is repeated and a dry $CO_2$-free methanator feed gas is produced having the same composition as that in Example I. The mole ratio $H_2$/CO in the feedgas stream to the methanator is held at the near optimum value of 1.00. A series of runs are made with the mole % $H_2O$ in the feed gas to the methanator in the range of 0 to 15. At 0 mole % $H_2O$ in the feed gas, the gross heating value of the effluent gas stream from the methanation zone after the removal of $H_2O$ and $CO_2$ is 973 BTU/SCF. As the mole % $H_2O$ in the feed gas is increased, the gross heating value of the product gas increases rapidly. For example with 0.5 mole % $H_2O$ in the feedgas the gross heating value of the product gas is 978. The gross heating value of the product gas raises sharply to a maximum of 981 BTU/SCF when the feed gas contains 2.0 mole % $H_2O$. However, any further additions of $H_2O$ in the feed gas causes the heating value of the product gas to fall. For example, at 15 mole % $H_2O$ the gross heating value has dropped to 970 BTU/SCF. The critical relationship between mole % $H_2O$ in the feed gas to the methanator and the BTU/SCF in the effluent gas from the methanator after removal of $CO_2$ and $H_2O$ is shown in FIG. 1.

To show criticality with respect to the mole ratio ($H_2$/CO) in the feed gas to the methanator, other runs are made at substantially the same conditions as previously described in Example I but with the feed gas to the catalytic methanator containing no $H_2O$ or $CO_2$ and with different mole ratios ($H_2$/CO). The results unexpectedly show that as the mole ratio ($H_2$/CO) in the feed gas drops below 1, the gross heating value of the dry $CO_2$ free product gas from the methanator falls sharply. For example, at a mole ratio ($H_2$/CO) of 0.5 the gross heating value drops to 550 BTU/SCF. A maximum gross heating value of 981 BTU/SCF is reached in this example when the mole ratio ($H_2$/CO) is 1.13 and then falls off fairly rapid as the mole ratio ($H_2$/CO) exceeds 1.5.

Obviously many modifications and variations of the invention as hereinbefore set forth may be made without departing from the spirit and scope thereof, and only such limitations should be imposed as are indicated in the appended claims.

We claim:

1. In a process for producing a methane-rich gas stream by the partial oxidation of a hydrocarbonaceous fuel with a free-oxygen containing gas in the presence of a temperature moderator to produce a process gas stream which is subsequently subjected to catalytic methanation the improvement comprising the steps of (1) reacting said hydrocarbonaceous fuel feed by partial oxidation with substantially pure oxygen comprising at least 95 mole % $O_2$ and a temperature moderator selected from the group consisting of $H_2O$, $CO_2$, and mixtures thereof at an autogenous temperature in the range of about 1700° to 3100°F and a pressure in the range of about 1 to 250 atmospheres gauge in the reaction zone of a free-flow unpacked noncatalytic synthesis gas generator, wherein the weight ratio of $H_2O$/hydrocarbonaceous fuel is in the range of 0.2 to 3, the atomic ratio of oxygen in the substantially pure oxygen to carbon in the hydrocarbonaceous fuel is in the range of about 0.75 to 1.0 and the stream of effluent gas leaving said synthesis gas generator comprises mixtures of $H_2$ and CO having a mole ratio $H_2$/CO in the range of about 0.5 to 1.15, $H_2O$, $CH_4$, $CO_2$ and one or more members of the group of impurities COS, $H_2S$, Ar, and $N_2$, and particulate carbon; (2) cooling the process gas stream from (1); removing therefrom particulate carbon, $CO_2$, $H_2S$, COS and adjusting the mole % $H_2O$ in the process gas stream to a value in the range of about 0.1 to 15; and adjusting the temperature to a value in the range of about 390° to 600°F.; (3) introducing the process gas stream from (2) into a catalytic methanation zone where said $H_2$ and CO are reacted together while in contact with a methanation catalyst at a pressure in the range of about 1 to 250 atm. to produce an effluent gas stream comprising $CH_4$ and containing one or more members of the group $H_2O$, $H_2$, $CO_2$, CO, $N_2$ and Ar; and (4) separating $H_2O$ and $CO_2$ from the effluent gas stream from (3), producing said methane-rich gas stream comprising at least 70 mole % of methane (dry basis).

2. The process of claim 1 wherein the gas stream from step (4) has a gross heating value of at least 800 BTU/SCF.

3. The process of claim 1 wherein step (2) the mole % $H_2O$ in the process gas stream is adjusted to the required amount by passing the process gas stream through a saturation vessel held at the saturation temperature corresponding to the partial pressure of the required amount of $H_2O$.

4. The process of claim 1 wherein the substantially pure oxygen in step (1) comprises 99 mole % $O_2$ or more, the mole ratio $H_2$/CO in the effluent gas stream leaving the synthesis gas generator is a value in the range of 1.0 to 1.13, the mole % $H_2O$ in the process gas stream is adjusted to a value in the range of 1.0 to 3.0, and the methane-rich gas stream from step (4) has a gross heating value of 980 BTU/SCF or more.

5. The process of claim 1 wherein the pressure in said synthesis gas generator is in the range of about 20 to 200 atmospheres.

6. The process of claim 1 wherein the pressure in steps (2) to (4) is substantially the same as in the gas generator in step (1), less ordinary drop in the lines.

7. The process of claim 1 wherein at least a portion of the hydrocarbonaceous fuel feed in step (1) comprises a pumpable slurry of a solid hydrocarbonaceous fuel selected from the group consisting of the particulate carbon separated in step (2), coal, and petroleum coke in admixture with a liquid selected from the group consisting of liquid hydrocarbon fuel and water.

8. The process of claim 1 wherein the hydrocarbonaceous fuel feed in step (1) is a liquid hydrocarbon selected from the group consisting of petroleum distillate, naphtha, gas oil, residual fuel, reduced crude, whole crude, coal tar, coal oil, shale oil, tar sand oil, asphalt and mixtures thereof.

9. The process of claim 1 wherein the methanation catalyst in step (3) comprises nickel oxide and aluminum oxide and the space velocity is in the range of about 100 to 10,000 standard volumes of gas per volume of catalyst per hour.

10. The process of claim 1 wherein prior to being introduced into the methanation zone in step (3) the process gas stream is preheated by noncontact indirect heat exchange with at least a portion of the effluent gas stream produced subsequently in the process in said methanation zone.

11. A process for producing a methane-rich gas stream from a process gas stream comprising $H_2$ and CO comprising:
  1. adjusting the mole ratio ($H_2/CO$) of said process gas stream to a value in the range of 0.5 to 1.15;
  2. adjusting the mole % $H_2O$ in the process gas stream to a value in the range of about 1.0 to 3.0:
  3. preheating the process gas stream from (2) to a temperature in the range of about 300° to 1000°F. by noncontact indirect heat exchange with at least a portion of the effluent gas stream from the methanation zone downstream in the process;
  4. introducing the preheated process gas stream from (3) into a catalytic methanation zone where said $H_2$ and CO are reacted together while in contact with a methanation catalyst at a temperature in the range of about 390° to 1400°F. and at a pressure in the range of about 1 to 250 atmospheres to produce a methane-rich gas stream comprising a mixture of $CH_4$ and one or more members of the group $H_2O$, $CO_2$, CO, $H_2$, $N_2$, and Ar; and
  5. separating $H_2O$ and $CO_2$ from the methane-rich gas stream from (4), thereby producing said methane-rich gas stream.

12. The process of claim 11 provided with the step of removing if present one or more members of the group $H_2$, CO, $N_2$ and Ar from the methane-rich gas stream from step (5), thereby producing substantially pure methane.

13. A process for producing a methane-rich gas stream comprising the steps of (1) reacting a sulfur-containing hydrocarbonaceous fuel feed by partial oxidation with substantially pure oxygen comprising at least 95 mole % $C_2$ at an autogenous temperature in the range of about 1700° to 3100°F, and a pressure in the range of about 1 to 250 atmospheres gauge in the reaction zone of a free-flow unpacked noncatalytic synthesis gas generator; wherein the weight ratio of $H_2O$/hydrocarbonaceous fuel is in the range of 0.2 to 3.0, the atomic ratio of oxygen in the substantially pure oxygen to carbon in the hydrocarbonaceous fuel is in the range of about 0.75 to 1.0, and the stream of effluent gas leaving said synthesis gas generator comprises $H_2$ and CO having a mole ratio $H_2/CO$ in the range of about 0.5 to 1.15, $H_2O$, $CH_4$, $CO_2$ and minor amounts of particulate carbon and gaseous impurities selected from the group consisting of COS, $H_2S$, A, $N_2$, and mixtures thereof; (2) cooling the process gas stream from (1), removing particulate carbon, and adjusting the mole % $H_2O$ in the process gas stream to a value in the range of about 0.1 to 15 and adjusting the temperature to a value in the range of about 400° to 700°F; (3) introducing the process gas stream from (2) into a catalytic methanation zone where said $H_2$ and CO are reacted together while in contact with a sulfur-resistant methanation catalyst at a pressure in the range of about 1 to 250 atmospheres and a temperature in the range of about 500° to 1500°F to produce an effluent gas stream comprising a mixture of $CH_4$ and one or more gaseous members of the group $H_2O$, $CO_2$, $H_2$, CO, COS, $H_2S$, Ar, and $N_2$, and; (4) separating one or more of said gaseous members from the effluent gas stream from the effluent gas stream from (3).

14. The process of claim 13 wherein the sulfur-resistant methanation catalyst in step (3) comprises in wt. % CoO 3 to 4, $MoO_3$ 9.5 to 16, and the remainder alumina.

* * * * *